US011167214B1

(12) United States Patent
White et al.

(10) Patent No.: US 11,167,214 B1
(45) Date of Patent: Nov. 9, 2021

(54) DYNAMIC GAME MANAGEMENT PLATFORM THAT UTILIZES PREDICTIVE ANALYTICS TO MODIFY GAME PARAMETERS IN REAL-TIME

(71) Applicant: Exponential Corp., Los Angeles, CA (US)

(72) Inventors: Jason White, Los Angeles, CA (US); Jeb Havens, Los Angeles, CA (US)

(73) Assignee: Exponential Corp., Los Angeles, CA (US)

( * ) Notice: Subject to any disclaimer, the term of this patent is extended or adjusted under 35 U.S.C. 154(b) by 98 days.

(21) Appl. No.: 16/849,791

(22) Filed: Apr. 15, 2020

Related U.S. Application Data

(60) Provisional application No. 62/833,840, filed on Apr. 15, 2019.

(51) Int. Cl.
*A63F 13/61* (2014.01)
*A63F 13/67* (2014.01)
*A63F 13/77* (2014.01)
*A63F 13/79* (2014.01)
*G06N 20/00* (2019.01)

(52) U.S. Cl.
CPC .............. *A63F 13/61* (2014.09); *A63F 13/67* (2014.09); *A63F 13/77* (2014.09); *A63F 13/79* (2014.09); *G06N 20/00* (2019.01)

(58) Field of Classification Search
CPC .......... A63F 13/61; A63F 13/67; A63F 13/77; A63F 13/79; G06N 20/00
See application file for complete search history.

(56) References Cited

U.S. PATENT DOCUMENTS

| | | | | |
|---|---|---|---|---|
| 5,271,626 A | * | 12/1993 | Llenas | A63F 13/005 273/430 |
| 5,697,844 A | * | 12/1997 | Kohorn | G07F 17/3262 463/40 |
| 5,738,583 A | * | 4/1998 | Comas | A63F 13/12 463/40 |
| 5,999,808 A | * | 12/1999 | LaDue | A63F 13/12 455/412.2 |
| 6,104,815 A | * | 8/2000 | Alcorn | A63F 13/12 380/251 |

(Continued)

*Primary Examiner* — Ronald Laneau
*Assistant Examiner* — Matthew D Hoel
(74) *Attorney, Agent, or Firm* — Sheppard Mullin Richter & Hampton LLP

(57) ABSTRACT

Systems and methods for implementing a dynamic game or contest management platform are described herein. The platform may be integrated with a programmatic advertising system and configured to utilize substantially real-time programmatic advertising information, predictive analytics, and/or one or more artificial intelligence (AI) algorithms to dynamically adjust parameters associated with the game or contest. The AI algorithm(s) may use historical ad revenue information and a number of other ad revenue projection factors described herein to predict the amount or generate an expectation of future ad revenue for a certain time period. Based on the prediction, the contest management platform may be configured to adjust a variety of parameters to dynamically adjust a game or contest itself and the projected prizes to be awarded based on one or more stored models designed to achieve a certain total prize amount awarded over a period of time.

16 Claims, 5 Drawing Sheets

(56) References Cited

U.S. PATENT DOCUMENTS

| | | | |
|---|---|---|---|
| 6,416,414 B1* | 7/2002 | Stadelmann | G07F 17/32 463/42 |
| 6,470,180 B1* | 10/2002 | Kotzin | A63F 13/12 455/412.1 |
| 6,527,641 B1* | 3/2003 | Sinclair | A63F 13/12 463/39 |
| 6,628,939 B2* | 9/2003 | Paulsen | G07F 17/32 455/414.1 |
| 6,650,892 B1* | 11/2003 | Thiriet | G07F 17/32 455/419 |
| 6,674,995 B1* | 1/2004 | Meyers | A63F 13/12 455/41.2 |
| 6,735,435 B2* | 5/2004 | Newell | A63F 13/12 455/419 |
| 6,767,284 B1* | 7/2004 | Koza | A63F 9/183 463/29 |
| 6,895,238 B2* | 5/2005 | Newell | A63F 13/12 455/414.2 |
| 7,197,646 B2* | 3/2007 | Fritz | G06F 21/31 713/182 |
| 7,577,978 B1* | 8/2009 | Wistendahl | H04N 21/4781 725/113 |
| 7,672,337 B2* | 3/2010 | Steelberg | H04N 21/222 370/486 |
| 7,711,313 B2* | 5/2010 | Steelberg | H04H 60/80 455/3.01 |
| 7,751,804 B2* | 7/2010 | Steelberg | H04H 60/06 455/414.2 |
| 7,761,328 B2* | 7/2010 | Kutaragi | A63F 13/12 705/14.4 |
| 7,826,444 B2* | 11/2010 | Irvin | H04H 20/22 370/360 |
| 7,889,724 B2* | 2/2011 | Irvin | H04H 60/06 370/360 |
| 7,925,201 B2* | 4/2011 | Irvin | G06F 16/68 455/3.01 |
| 8,303,416 B1* | 11/2012 | Thakkar | G06F 3/048 463/42 |
| 8,342,967 B2* | 1/2013 | Thakkar | A63F 13/795 463/42 |
| 8,348,765 B1* | 1/2013 | Thakkar | A63F 13/795 463/42 |
| 8,468,561 B2* | 6/2013 | Ketchum | H04H 20/103 725/32 |
| 8,495,089 B2* | 7/2013 | Steelberg | G06Q 30/0245 707/770 |
| 8,571,931 B2* | 10/2013 | Riedl | G06Q 30/0276 705/14.49 |
| 8,622,828 B1* | 1/2014 | Harrington | A63F 13/85 463/31 |
| 8,734,243 B2* | 5/2014 | Harrington | G06Q 50/01 463/29 |
| 8,738,427 B2* | 5/2014 | Damaghi | G06Q 90/00 705/14.1 |
| 8,764,561 B1* | 7/2014 | Lan | A63F 13/12 463/31 |
| 8,979,651 B1* | 3/2015 | Lan | A63F 13/79 463/31 |
| 8,986,116 B1* | 3/2015 | Harrington | A63F 13/53 463/29 |
| 9,368,039 B2* | 6/2016 | Mills | G09B 7/00 |
| 9,533,217 B2* | 1/2017 | Naik | G06Q 10/101 |
| 9,600,787 B2* | 3/2017 | Lopez | G06F 16/2282 |
| 9,682,315 B1* | 6/2017 | Miller | A63F 13/847 |
| 9,757,650 B2* | 9/2017 | Mehra | A63F 13/352 |
| 9,779,576 B2* | 10/2017 | Shoenhair | G07F 17/329 |
| 9,844,723 B2* | 12/2017 | Gregory | A63F 13/77 |
| 9,895,609 B2* | 2/2018 | Miller | A63F 13/795 |
| 9,968,849 B1* | 5/2018 | Lan | A63F 13/25 |
| 10,335,678 B2* | 7/2019 | Takahashi | G06F 3/04817 |
| 10,376,788 B2* | 8/2019 | Lan | A63F 13/25 |
| 10,384,132 B2* | 8/2019 | Ware | A63F 13/30 |
| 10,391,388 B2* | 8/2019 | Kamekawa | A63F 13/795 |
| 10,403,097 B2* | 9/2019 | Nakamura | G07F 17/34 |
| 10,409,457 B2* | 9/2019 | Baack | A63F 13/35 |
| 10,413,820 B2* | 9/2019 | Miller | A63F 13/335 |
| 10,561,952 B2* | 2/2020 | Sutaria | A63F 13/44 |
| 10,610,771 B2* | 4/2020 | Kamekawa | A63F 13/795 |
| 10,625,149 B2* | 4/2020 | Kamekawa | H04L 51/046 |
| 10,646,781 B2* | 5/2020 | Lan | A63F 13/795 |
| 10,688,397 B2* | 6/2020 | Sato | A63F 13/35 |
| 10,699,524 B2* | 6/2020 | Cuddy | G07F 17/3258 |
| 10,717,007 B2* | 7/2020 | Gillespie | A63F 13/69 |
| 10,888,788 B2* | 1/2021 | Osman | A63F 13/5375 |
| 10,918,952 B2* | 2/2021 | Ware | A63F 13/32 |
| 10,981,052 B2* | 4/2021 | Kuwatani | A63F 13/21 |
| 10,981,067 B2* | 4/2021 | Kuwatani | A63F 13/87 |
| 10,987,584 B2* | 4/2021 | Lan | A63F 13/5375 |
| 11,014,001 B2* | 5/2021 | Li | G06T 17/00 |
| 11,043,068 B2* | 6/2021 | Fan | G06F 21/33 |
| 11,043,071 B2* | 6/2021 | Crittenden | G07F 17/3225 |
| 11,082,746 B2* | 8/2021 | Lockton | A63F 13/355 |
| 11,103,781 B2* | 8/2021 | Kamekawa | A63F 13/50 |
| 2001/0003099 A1* | 6/2001 | Von Kohorn | H04H 20/38 463/40 |
| 2002/0178058 A1 | 11/2002 | Arlen | |
| 2003/0003990 A1* | 1/2003 | Von Kohorn | G07F 17/3295 463/25 |
| 2003/0139190 A1* | 7/2003 | Steelberg | G06Q 10/087 455/456.1 |
| 2004/0038723 A1* | 2/2004 | Schneier | G06Q 30/0225 463/17 |

* cited by examiner

DYNAMIC GAME MANAGEMENT PLATFORM THAT UTILIZES PREDICTIVE ANALYTICS TO MODIFY GAME PARAMETERS IN REAL-TIME

CROSS-REFERENCE TO RELATED APPLICATIONS

This application claims priority to U.S. Provisional Patent Application No. 62/833,840, filed Apr. 15, 2019, which is hereby incorporated by reference in its entirety.

FIELD OF THE INVENTION

The invention relates to the implementation of a dynamic game management platform where game parameters can be varied in real-time based on predictive analytics.

BACKGROUND OF THE INVENTION

Billions of dollars in advertising are transacted through the programmatic ad ecosystem, which allows publishers to partner with companies and ad exchanges to insert ads electronically into online environments. Various types of advertising supported contests are known. Many offer prizes (money or property) to winners. For example, U.S. Patent Application Publication No. 2002/0178058, entitled "Method of Communicating Over an Interactive Medium," which is incorporated herein by reference in its entirety, describes a type of advertising-supported contest in which prizes are offered to winners. Various challenges exist with these models. For example, one is the need to avoid structuring them in a way that constitutes illegal gambling. In some cases, this is done by avoiding an entry fee. This, however, may lead to the problem of the prize money offered exceeding the ad revenue that is generated to support the contests.

Currently, there are other apps that pay out real cash to users. These app attempt to pay for these payouts by raising money through advertising or sponsorships. For example, many apps use a fixed payout approach. One such example—HQ Trivia—holds a daily trivia contest, where any players that answered all (or the most) questions correct split the day's prize(s) among themselves. For example, if today's prize is $5,000, and there are 1,000 winners today, then each winner would receive $5 that they can cash out (e.g., into a PayPal account). Similarly, many "Free Scratcher" apps offer users the chance to play virtual "scratch-off tickets" each day, with the possibility of winning real cash prizes. These apps may cost nothing to play, but the player must view advertising and related offers throughout their experience. There are also apps that pay users real money for taking surveys or participating in free trials (e.g., the Swagbucks app). In these apps, the user completes tasks that are of some value to the sponsor, and they get some fraction of the revenue for that action (paid by the sponsor).

In each of these cases, the financial risk from paying out money to users is minimal because the costs are predictable, fixed, and capped. For example, if HQ Trivia suddenly gets double the number of winners one day, its financial payout is still the exact same (i.e., each winner just gets half as much money). The Free Scratcher apps can treat any monetary payouts like a raffle (or like actual scratch-off tickets), where only one player will win the big prize in a given time period, so the costs are predictable and fixed. The paid survey apps simply pass any financial risk through to the sponsors who put forth the surveys (with the amount paid based on how much that survey is worth to them).

If a platform desires to offer something other than fixed prizes, the management of that becomes more difficult. In these non-fixed prize systems, balancing the variable or dynamic payouts with the projected ad revenue is a challenge. This is a two-sided problem because the ad revenue is not fixed, and the prizes are not fixed. Prior systems suffer from a lack of suitable technology to overcome these and other problems associated with ad-supported games and contests that do not offer fixed payouts.

SUMMARY OF THE INVENTION

Various aspects of the present disclosure include systems and methods that implement a dynamic game or content management platform that utilizes predictive analytics to vary parameters associated with gameplay and/or prizes in real-time. In various implementations, the dynamic game or contest management platform may be integrated with a programmatic advertising system. The systems and methods described herein may address one or more of the foregoing and/or other problems or drawbacks associated with prior systems and methods for managing ad-supported games and contests that do not offer fixed payouts. One aspect of the technical solution to these problems or drawbacks is represented in the platform itself, which may be configured to utilize substantially real-time programmatic advertising information, predictive analytics, and/or one or more artificial intelligence (AI) algorithms to dynamically adjust parameters associated with a game or contest. For example, the platform may be configured to dynamically vary how often a user is able to play, who users may be matched up to compete with, the rules/requirements for receiving a prize, and/or other parameters associated with a game or contest.

In various implementations, the systems and methods described herein may employ AI algorithm(s) that utilize, for example, historical ad revenue information and a number of other ad revenue projection factors described herein to predict the amount or generate an expectation of future ad revenue for a certain time period. Based on the prediction, the platform may be configured to adjust a variety of parameters to dynamically adjust a game or contest itself and/or the potential prize received from the game or contest based on one or more stored models designed to award a certain prize amount over a period of time. Among other things, the platform may consider and vary access and growth rules, financial bonuses and award mechanics, game and product features, one or more financial requirements or parameters, advertising exposure, and/or other parameters or information. In various implementations, the platform may be configured to monitor in real-time the actual prizes awarded and update projected prize amounts based on data analytics as data is collected and AI algorithms that will predict prizes awarded based on currently available data and stored models.

Other aspects of the invention relate to balancing prize mechanics to contestants (and/or partners) by utilizing one or more AI algorithms that attempt to optimize decisions related to the distribution of programmatic ad revenue through user participation, where parameters are dynamically adjusted based on the attempted optimization. Other aspects of the invention relate to optimizing a single or dually uncertain marketplace or economy in which both sides of a market are dependent and uncertain. As used herein, a contest can include or comprise one or more games of a variety of types played by two or more players and/or by one or more players against an artificial intelligent agent or bot. Accordingly, the platform described herein may be utilized to manage a single game or contest and/or a game or contest comprising multiple different games.

One aspect of the invention relates to computer-implemented systems and methods for efficiently and dynamically managing ad-supported games or contests. In various implementations, the system may include a website through which players can participate in contests (including a variety of types of games). Users may be required to create an account that includes and/or is linked to an account balance. Initially, the balance may be set to $0 (or some other predetermined amount). The user may be presented with a user engagement task. For example, the user may be required to watch and/or interact with a certain amount and/or form of commercial advertising or other content in order to obtain some initial (or additional) money or other form of account credit, which may later be used to compete in a game or contest. For convenience, activities of this type will be referred to as a user engagement task.

In an example implementation, a user may be required to watch an ad and then answer a trivia question based on the content of the ad (such as "what color was the soda can in the Coca-Cola ad you just saw?"). Answering such a question accurately provides verification that the user watched and retained the content of the ad. In other cases, the user may be required to simply answer a survey, engage in a product trial, install an app, visit a website, and/or do some other user engagement task to increase their account balance. Other user engagement tasks can be implemented. In various implementations, the system may credit the account balance of a user with a predetermined amount (e.g., one penny or $0.01), which may be deposited into the user's account upon satisfactory completion of a user engagement task. Points, virtual currency, and/or other methods of tracking an account balance can also be used. For simplicity, these may be referred to as account credits.

Once a user has credit in their account, they are permitted to start playing short competitive games or other contests in real-time against one or more other players. The other players may include randomly-selected player(s), algorithmically selected player(s), or computer-controlled bot(s) (e.g., if the system wishes to provide a match when no humans are available). Each contest may require the player to put in an "ante" from their account balance. If the player loses the game, the player loses that "ante" amount (i.e., their account is reduced by that amount of credit). If the player wins the game, the player may double their "ante" amount. For example, if a user plays a game where they must put in $0.08 worth of credit, they could win $0.16 in total credit. If the player ties the game, the player may get their "ante" credit back.

When the player's account balance is above a predetermined account balance level, the player may be eligible to receive a prize (or given the ability to cash out). In other words, the user/player may elect to have some or all of their account balance converted to value, e.g., by being transferred to an external "real cash" account (e.g., a bank account, PayPal account, and/or other account) when their account balance reaches a predetermined account balance level.

As the platform scales (e.g., from hundreds to thousands to millions of users), it becomes increasingly more difficult to ensure that the compensation paid to users for user engagement tasks does not exceed the ad revenue received. Relying upon the programmatic ad ecosystem to enable the platform to launch and scale is a non-trivial undertaking. One aspect of the invention relates to a computer-implemented system and method that enables the platform to achieve a level of optimization, in real-time or near real-time, regarding the projected ad revenue to be received over a period of time versus: the amount of credits to be offered to users for user engagement tasks over a period of time; the frequency with which users can play in individual games; the amount of credits that can be won; the threshold amount of credits a user must accumulate before being able to receive a prize or cash credits out; and/or other factors. Balancing these factors can be done using a variety of algorithms that take these factors into account.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The drawings are provided for purposes of illustration only and merely depict typical or example implementations. These drawings are provided to facilitate the reader's understanding and shall not be considered limiting of the breadth, scope, or applicability of the disclosure. For clarity and ease of illustration, these drawings are not necessarily drawn to scale.

DESCRIPTION OF THE INVENTION

It will be appreciated by those having skill in the art that the implementations described herein may be practiced without these specific details or with an equivalent arrangement. In various instances, well-known structures and devices are shown in block diagram form to avoid unnecessarily obscuring the implementations.

Example System Architecture

Figure 1:
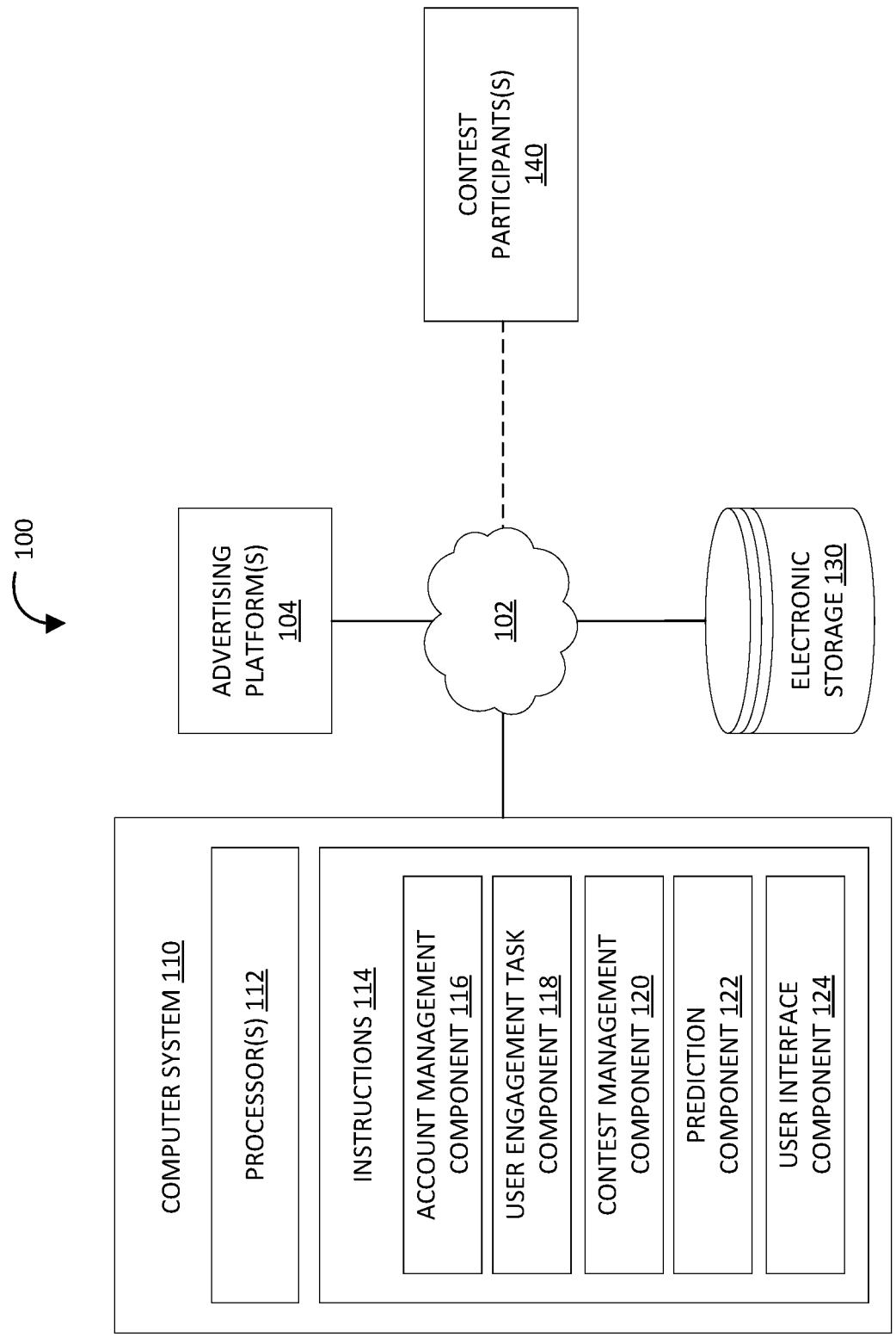
FIG. 1 illustrates an example system for implementing a dynamic game or contest management platform integrated with a programmatic advertising system, in accordance with one or more implementations of the invention.

FIG. 1 illustrates an example system 100 for implementing a dynamic game or contest management platform integrated with a programmatic advertising system, in accordance with one or more implementations of the invention. The dynamic game or contest management platform may be configured to manage a game or contest involving multiple participants 140 (also referred to herein as users or players). In various implementations, system 100 may be configured to utilize substantially real-time programmatic advertising information, predictive analytics, and/or one or more artificial intelligence (AI) algorithms to dynamically adjust parameters associated with a game or contest. For example, system 100 may be configured to dynamically vary how often a user is able to play, who users may be matched up to compete with, the rules/requirements for receiving a prize, and/or other parameters associated with a game or contest.

In various implementations, system 100 may include a computer system 110, electronic storage 130, and/or one or more other components. Computer system 100 may comprise one or more physical processors 112 programmed to implement the functions described herein and/or one or more other components. The one or more physical processors 112 (also interchangeably referred to herein as processor 112, processor(s) 112, or processors 112 for convenience) may be configured to provide information processing capabilities in system 100. In various implementations, processor(s) 112 may be configured to execute one or more computer readable instructions 114. Executing the computer readable instructions 114 may cause one or more processors 112 to implement the dynamic contest management platform.

Computer readable instructions 114 may include one or more computer program components. In some implementations, computer readable instructions 114 may be stored in electronic storage (e.g., electronic storage 130). Computer readable instructions 114 may include one or more of an account management component 116 configured to manage user accounts, a user engagement task component 118 configured to manage user engagement tasks, a contest management component 120 configured to manage contests, a prediction component 122 configured to predict various advertising revenue and/or one or more factors and/or information related to a contest, a user interface component 124 configured to generate one or more user interfaces that comprise the dynamic contest management platform described herein, and/or one or more other computer program components. As used herein, for convenience, the various computer readable instructions 114 will be described as performing an operation, when, in fact, the various instructions program the processor(s) 112 (and therefore system 100) to perform the operation.

Electronic storage 130 may store software algorithms, information determined by processor(s) 112, information received from/by computer system 110, information received from one or more advertising platforms 104, information received from one or more external resources, and/or other information that enables computer system 110 to function as described herein. In some implementations, computer system 110 and one or more other components of system 100 may be included within a single device configured to implement the dynamic contest management platform described herein. For example, computer system 110 and electronic storage 130 may be included within a single device.

As described herein, user interface component 124 may be configured to generate one or more user interfaces that comprise the dynamic contest management platform described herein. In various implementations, the one or more user interfaces may comprise or be part of a website through which players can participate in contests (including a variety of types of games). Users may be required to create an account that includes and/or is linked to an account balance. Initially, the balance may be set to $0 (or some other predetermined amount). The user may be presented with a user engagement task. For example, the user may be required to watch and/or interact with a certain amount and/or form of commercial advertising or other content in order to obtain some initial (or additional) money or other form of account credit, which may later be used to compete in a game or contest. For convenience, activities of this type will be referred to as a user engagement task.

In an example implementation, a user may be required to watch an ad and then answer a trivia question based on the content of the ad (such as "what color was the soda can in the Coca-Cola ad you just saw?"). Answering such a question accurately provides verification that the user watched and retained the content of the ad. In other cases, the user may be required to simply answer a survey, engage in a product trial, install an app, visit a website, and/or do some other user engagement task to increase their account balance. Other user engagement tasks can be implemented.

Figure 2:
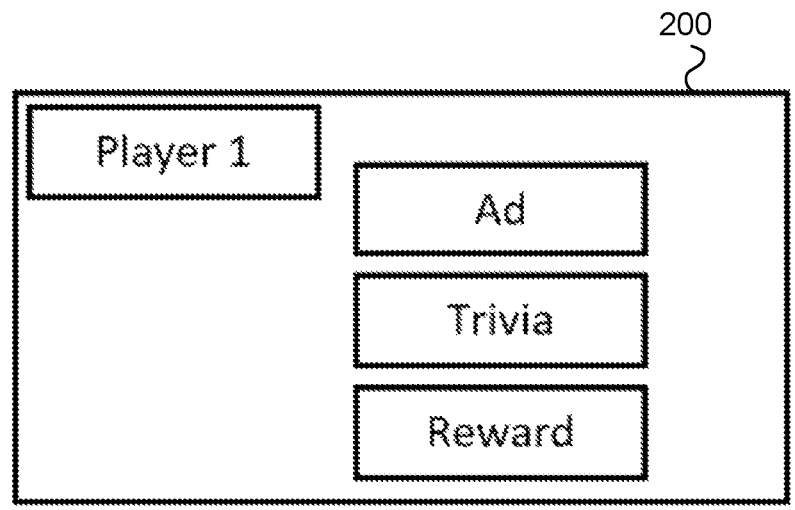
FIG. 2 illustrates an example of a user interface for a user engagement task, in accordance with one or more implementations of the invention.

FIG. 2 illustrates an example user interface 200 for a user engagement task, in accordance with one or more implementations of the invention. As shown, for a given user, user interface component 124 configured to generate example user interface 200 to present a user engagement task, such as an ad to be watched, and optionally, a trivia question to answer and/or other action for the user to take upon watching the advertisement (referred to herein interchangeably as "ad"). In some implementations, example interface 200 may also display the amount of money or other credit that the user may receive upon successful completion of the task.

In various implementations, computer system 110 be configured to credit the account balance of a user with a predetermined amount (e.g., one penny or $0.01), which may be deposited into the user's account upon satisfactory completion of a user engagement task. Points, virtual currency, and/or other methods of tracking an account balance can also be used. For simplicity, these may be referred to as account credits.

Once a user has credit in their account (e.g., upon completion of a task), the user may be offered an opportunity play in a game or contest against one or more other players. The one or more other players may include randomly-selected player(s), algorithmically selected player(s), or computer-controlled bot(s) (e.g., if the system wishes to provide a match when no humans are available). In some implementations, individual users' performance against artificially intelligent agents or bots may be monitored and tracked and stored in the user account associated with the user. Based on a given participant's historical performance in the contest, including their historical performance against artificially intelligent agents or bots, the dynamic game or contest management system may be configured to adjust whether the participant may be matched with an artificially intelligent agent or bot and/or the likelihood that the participant is matched with an artificially intelligent agent or bot. Accordingly, the availability to be matched with an artificially intelligent agent or bot and/or the likelihood of being matched with an artificially intelligent agent or bot may comprise another game parameter that may be varied using the techniques described herein.

In various implementations, account management component 116 and/or contest management component 120 may be configured to determine whether an account balance for a user (also referred to herein as player or participant) meets or exceeds a threshold amount required to participate in a game. Responsive to a determination that the account balance of the user meets or exceeds a threshold amount required to participate in a game, contest management component 120 may be configured to prompt the user to provide user input indicating a request to compete in a game.

The game may require the payment of an ante which is deducted from the player's account. For example, the contest parameters may specify a minimum ante amount associated with a game or contest. If the user wins, contest management component 120 may be configured to credit their account with a value associated with winning the contest. In some implementations, if the player wins the game, the player may double their "ante" amount. For example, if a user plays a game where they must put in $0.08 worth of credit, they could win $0.16 in total credit. If the player ties the game, the player may get their "ante" credit back. If the user does not win, contest management component 120 may be configured to offer another user engagement task or, if they have sufficient credit in their account, the opportunity to play in another contest.

Online contests, games, and/or other competitions between participants may involve two or more players. In other words, games may involve two players (two users or one user and a computer-controlled bot) or more than two players. For example, once a user has credit in their account, the user may be offered an opportunity to play in a game or contest against one other player, as described herein. In some implementations, the user may be offered an opportunity to play in a game or contest involving two or more other players. For example, a user may be given an opportunity to play in an online game involving 99 other players. Each of the 100 players may be required to pay an account credit of one penny ($0.01) to participate. Accordingly, $1.00 may be collected—the totality of which may be allocated to the winning player or could be allocated to a set of players finishing in predefined positions (e.g., $0.75 to the first place player and $0.25 to the second place player, etc.). The system may be configured to determine whether and/or when to offer games involving more than two players, how the amount of account credits collected is awarded to individual participants in the game, and/or other parameters associated with the game using one or more of the techniques described herein.

Figure 3:
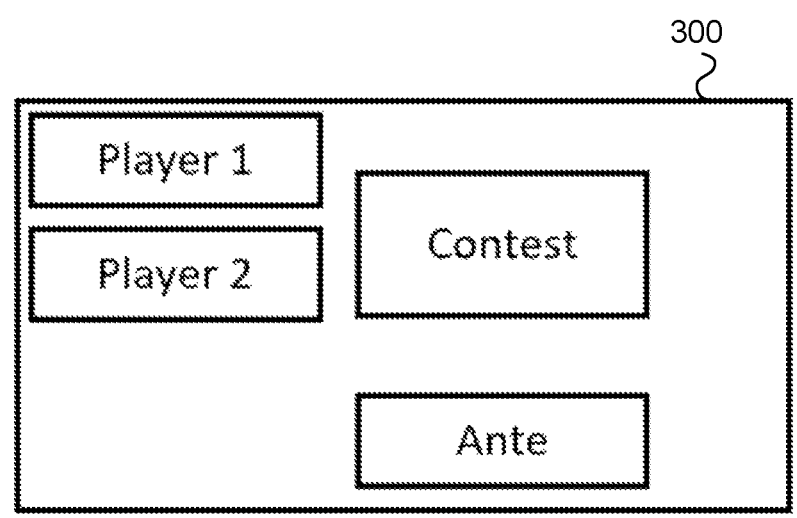
FIG. 3 illustrates an example of a user interface for a game or contest, in accordance with one or more implementations of the invention.

FIG. 3 illustrates an example user interface 300 for a contest, in accordance with one or more implementations of the invention. As shown, for a given set of users, user interface component 124 configured to generate example user interface 300 to present a game for the set of users and the ante amount to enter the game. The set of users may be two or more users. Alternatively, the set of users may be one user and a bot.

When the player's account balance is above a predetermined account balance level, the player may be eligible to receive a prize (or given the ability to cash out). In other words, the user/player may elect to have some or all of their account balance transferred to an external account when their account balance reaches a predetermined account balance level. For example, the user/player may elect to have some or all of their account balance converted to value, e.g., by being transferred to an external "real cash" account (e.g., a bank account, PayPal account, and/or other account) when their account balance reaches a predetermined account balance level. In some implementations, the user may be presented with the opportunity to select from one or more external accounts and/or types of accounts into which to have some or all of their account balance transferred. For example, the user may elect to receive a prize comprising an equivalent amount of some or all of their account balance in product coupons/discounts/subsidies, airline miles, other types of loyalty points or currencies, privileges in the contest itself, and/or other prizes.

In various implementations, account management component 116 may be configured to determine whether the balance in a user's account is greater than or equal to a threshold level associated with receiving a prize. If the balance in the user's account is greater than or equal to that threshold level, contest management component 120 may be configured to offer the user the opportunity to cash out some and/or all of their account balance. If not, or if the player elects not to cash out, contest management component 120 may be configured to again offer one or more user engagement tasks and/or the ability to play in one or more contests. If a player elects to cash out, system 100 may be configured to pay the player or other users based on input received from the player. For example, the player may be paid via electronic payment and/or the player may elect to have the payment paid to one or more users (e.g., a close friend of the user) via an electronic payment mechanism. When paid out, the value paid is deducted from the user's account. After cashing out, the player may again be offered one or more user engagement tasks and/or the ability to play in one or more contests.

In various implementations, prediction component 122 may be configured to utilize substantially real-time programmatic advertising information, predictive analytics, and/or one or more artificial intelligence (AI) algorithms to dynamically adjust parameters associated with a game or contest. For example, prediction component 122 may be configured to employ AI algorithm(s) that utilize historical ad revenue information and a number of other ad revenue projection factors described herein to predict the amount or generate an expectation of future ad revenue for a certain time period. Based on the prediction, computer system 110 may be configured to adjust a variety of parameters to dynamically adjust a game or contest itself and/or the potential prize received from the game or contest based on one or more stored models designed to award a certain prize amount over a period of time. Among other things, computer system 110 may be configured to consider and vary access and growth rules, financial bonuses and award mechanics, game and product features, one or more financial requirements or parameters, advertising exposure, and/or other parameters or information. In various implementations, computer system 110 may be configured to monitor in real-time the actual prizes awarded and update projected prize amounts based on data analytics as data is collected and AI algorithms that will predict prizes awarded based on currently available data and stored models.

The systems and methods described herein may also be configured to optimize a single or dually uncertain marketplace or economy in which both sides of a market are dependent and uncertain. As used herein, a contest can include or comprise one or more games of a variety of types played by two or more players and/or by one or more players against an artificial intelligent agent or bot. Accordingly, the platform described herein may be utilized to manage a single game or contest and/or a game or contest comprising multiple different games.

In various implementations, prediction component 122 may be configured to utilize one or more AI algorithms that attempt to optimize decisions related to the distribution of programmatic ad revenue through user participation, and computer system 110 may be configured to dynamically balance prize mechanics to contestants (and/or partners) based on the attempted optimization.

In various implementations, prediction component 122 may be configured to utilize a computer algorithm to predict the projected future earnings to be expected from a given user who is about to be offered a task that would earn them account credits and compare the predicted potential future earnings to the projected future expense in related payouts from those account credits. In various implementations, the computer algorithm may be configured to focus on adjusting parameters in order to keep earnings above expenses (e.g., adjusting the maximum number of new account credits per user per day). In various implementations, computer system 110 may be configured to use the predicted potential future earnings and projected future expense in related payouts to determine the amount of additional earnings that can be put into bonus pools for additional boosts or incentives to grow the overall system while still covering future payouts.

In some implementations, one or more computer algorithms used by the systems and methods described herein may be configured to determine whether a user should be allowed to request a fresh penny (or other an account credit) or not at a given time and/or when a user should be allowed to request a fresh penny (e.g., what day and/or time of day) or other account credit. For example, an algorithm may be configured to take into account one or more inputs comprising an indication of historic cost per thousand impressions ("CPM"), a fill rate for a given user or type of user seasonally, individual user data (e.g., age, geography, gender, number of ads watched in the past day, numbers of ads watched in the past week, and/or other user data), number of games a user has played (e.g., games played in the 24 hours, past week, and/or other time period), and/or other information to determine one or more outputs. In various implementations, the one or more outputs may include whether a given user will be able to "earn" a credit by participating in a user engagement task, when such a user could "earn" such a credit for doing so, how many credits can be earned by such a user in a given time period for participating in such engagement tasks, whether such an engagement task might include calling for a paid video ad experience, whether to subsidize some or all of the cost of their penny (or credit) for participating in a user engagement task that does not necessarily generate sufficient value to cover the cost of such a credit, whether to display notice to return later, and/or other outputs.

In some implementations, one or more computer algorithms used by the systems and methods described herein may be configured to determine the value of a user and determine different outputs to incentivize a user at different points in the user experience. For example, an algorithm may be configured to consider one or more inputs indicating, for a given user, an average number of games played per account credit, a number of referrals and/or the activity of one or more individuals referred by the user, an average CPM, a number of games played in total, a number of cash outs, and/or other information to determine one or more outputs. In various implementations, the one or more outputs may include whether a user account credit is to be subsidized, whether the user is to receive a free life saver or a boost to incentivize the user to stay on and play, and/or other outputs.

In some implementations, one or more computer algorithms used by the systems and methods described herein may be configured to determine how many advertisements to show a user before providing the user a new account credit. For example, an algorithm may be configured to consider one or more inputs indicating a number of ads watched by a given user (e.g., over the course of the prior day, week, month, and/or other time period), an average number of ads watched before a user drops off (or stops watching), a number of games lost, and/or other information to determine one or more outputs. In various implementations, the one or more outputs may include whether to show a user a first number of video ads (e.g., one) or a second number of video ads (e.g., three) before providing an account credit, whether to subsidize the user to keep the user engaged, and/or other outputs.

In some implementations, one or more computer algorithms used by the systems and methods described herein may be configured to utilize seasonal and/or historic inputs to determine outputs indicating when to adjust system controls, inject incentives into the system, and/or otherwise adjust the system or one or more other parameters. For example, an algorithm may be configured to consider one or more inputs indicating historic CPM and/or fill rate, seasonality, current time or date, and/or other inputs to provide one or more outputs. In various implementations, the one or more outputs may include whether to inject more incentives into the system to encourage gameplay because it is a high CPM holiday season, to tighten system controls like a limit on number of account credits earnable per day because it is a low post-holiday season where CPMs, fill rate, and frequency caps are all low, and/or other outputs.

In various implementations, the systems and methods described herein may be configured to measure a range of signals and control a multitude of outcomes in real-time or near real-time in order to be able to grow the community and attempt to optimize the value proposition for players and advertisers, all while remaining solvent and profitable. By way of example, real-time decisions can be made based on predicting future expected ad revenue and future expected game play activity/cash payouts, each of which may comprise two non-determinate systems. Ad revenue, the amount of money that will be generated over some period of time, from any given potential ad impression, is based on many factors, such as historical CPM rates, known and inferred information about that player, seasonality, and/or other factors.

In various implementations, the dynamic game or contest management system may be configured to utilize the techniques described herein to modify one or multiple game parameters. In some implementations, the techniques described herein to pause or stop game activity. For example, based on projected future advertising revenue, one or more other predictive analytics, and/or other information available to the system, the dynamic game or contest management system may be configured to temporarily or indefinitely pause gameplay (i.e., prevent access to a game or contest).

Account balance credits are the amount of money or credits the system gives to a player after satisfactorily completing a user engagement task and which user can accumulate by participating in games or activities against other user (i.e., other players and/or artificially intelligent agents or bots). Account balance credits may constitute a cost to the system operator. The system can predict what percentage of the account balance credits will effectively be paid out at some future date based on a number of factors, such as redemption/abandonment rates, how much of the account balance credits is "paid back" by playing multiple games (and viewing multiple display ads) before needing another account balance credit, the minimum threshold of credits a user must accumulate before being eligible to cash out, how much money gets paid out to other players as "free boosters" along the way, what a player's expected future play level is, what a player's likely propensity is to refer other desirable players, and/or other factors.

Unlike traditional publishers which often seek to optimize ad revenue in order to maximize profitability and user engagement, the challenge in this context is to attempt to optimize multiple ad variables as well as player/contest variables in order to make real-time or near real-time decisions that must be made accurately and timely to keep the system economically sound.

Example inputs that must be processed in real-time or near real time may include some or all of the following:
(i) Average historical CPM rates for certain types of ads (format, length, etc.);
(ii) Historical data in various timeframes and scenarios (including seasonality);
(iii) Current ad availability/demand levels from programmatic ad networks (which, for example, may be based on the monitoring of current macro and/or micro economic or societal factors that affect or could affect ad demand levels);
(iv) Data about the user that can affect CPM (geography, age, interests, previously-seen ads, survey responses, drop-off behavior, referral of other players, etc.);
(v) Volume of player activity;
(vi) Time of day (and/or other temporal factors);
(vii) Player response levels to past incentives;
(viii) Average historical player payouts and redeem rates/abandonment rates;
(ix) Average historical games played per player before requiring a new deposit of starting money;
(x) Target earnings needed to cover payouts plus additional costs (player bonuses, referral incentives, growth, expenses, etc.).

Example outputs for which the system should attempt to optimize in real-time or near real time may include some or all of the following:
(i) Whether to show an ad to a given user at a given point;
(ii) The number of ads;
(iii) The ad format/network/type/engagement test;
(iv) Number of players allowed to play (in a given time period);
(v) When and/how often players are allowed to play (e.g., during which time/day intervals);
(vi) Account balance levels required to play and/or receive a prize;
(vii) Amount of money deposited into player accounts (in a given time period);
(viii) The percentage of computer-controlled opponents to allow;
(ix) Size of player behavior bonuses;
(x) Other adjustments to game rules.

The need to attempt to optimize the balance of ad revenue and account balance credits/payouts results from the more complicated scenario where the payouts are not predictable or fixed (i.e., the system takes risk on both the non-determinate income side and the non-determinate contest payout side). The system operator needs to actually pay cash to winners of the contests. In addition to the unknowns inherent in programmatic advertising, there are many unknown factors to consider regarding the contest, such as how many games will players play before falling back down and needing another account balance credit, or how likely is an account balance credit in the system to be eventually paid out (and/or on what schedule).

As described herein, the dynamic contest management platform may be configured to continuously monitor, analyze, model, predict, and adjust parameters associated with a contest. Parameters associated with a contest may include access and growth rules, financial bonuses and award mechanics, game and product features, one or more financial requirements or parameters, advertising exposure, and/or other contest parameters or information. Access and growth rules may include parameters related to or specifying the number of allowable new player registrations during a given time period (e.g., per geographic area and/or other demographic characteristic), amount of allowable game play (e.g., per day, week, month, per geography, and/or other user characteristic), amount and nature of in-game monetary sign-up bonus (e.g., per time interval, per geography and/or other user characteristic), invitation allowance indicating how many new users may be invited by existing users or may be permitted to register for play after being invited by existing users or otherwise applying to register (e.g., per time interval, geography, and/or other user characteristic). Financial bonuses and award mechanic parameters may include parameters related to or specifying size, type, and/or distribution rules for in-game financial and non-financial bonuses (e.g., per time interval, per geography and/or other user characteristic). Game and product feature parameters may include parameters related to or specifying new game integrations, game length and timing decisions, game unlock sequence, game rules, game matching rules, games/tournament level rules, nature and frequency of push notifications, SMS and/or email contact. Game and product feature parameters may vary, for example, based on geographic area, product conditions, and/or other user characteristics. Financial requirements and/or parameters may include parameters related to or specifying rules, requirements, or fees related to cashing out; subscription services, offerings, or pricing; strategic marketing expenditures, amounts, or details; and/or other financial requirements or parameters. Financial requirements and/or parameters may vary, for example, based on time, geographic area, product conditions, and/or other user characteristics. Advertising exposure parameters may include parameters related to or specifying scale, type, format, placement, and frequency of ad impressions in product user experience (e.g., based on time, geographic area, product conditions, user characteristics, etc.); ad optimization tactics (e.g., adjusted for time, geographic area, product conditions, user characteristics, etc.); ad partners (e.g., based on formats, partner reputation, partner offerings, etc.); data gathering, sharing and targeting rules and/or similar features (e.g., by time, geographic area, product conditions, user characteristics, etc.).

According to another aspect of the invention, higher level games may be streamed or otherwise published, analogous to on air game shows. For example, games may be streamed or otherwise published via a platform administered by the systems described herein. As the games become published, the audience watching other players may be presented ads to generate additional revenue. This additional ad revenue can be factored into the economic modeling/prediction algorithm. Similarly, some of the game may include a "voting" or "prediction" mechanic in which the community of users can vote on/predict whose submission in another game/ challenge should be declared the winner. As part of that voting/prediction experience, the community may see ads that similarly influence the economic modeling/prediction algorithm.

In some implementations, users may provide input regarding viewable games (e.g., higher level games streamed or otherwise published as described above). For example, a user may be prompted to vote on a contest. In some implementations, users may receive ad-driven cash prizes based on streamed or otherwise published games. For example, ad-driven contests may be adjudicated by watching audiences able to vote on the contest. The streamed or otherwise published games may comprise third-party contests such as other games, or other watchable content such as streaming eSports to diversify the content in which users are able to participate.

In various implementations, a user engagement task described herein may comprise or be associated with a commercial break experience. A commercial break experience may comprise one or more paid formats, and each format may consist of one or more paid engagements. Examples of formats include display ads, video ads, downloadable app previews, surveys, questionnaires, micro-tasks, image tagging and/or other paid engagement activities. A commercial break could therefore consist of any combination of these engagements or formats (e.g., two video ads, one video ad plus one display ad, one display ad plus one survey, one video ad plus one app download, and/or other combinations of the above referenced engagements or formats). Each commercial break may consist of the actual or predicated highest yielding format for a given user at a given time, including by running multiple simultaneous auctions (e.g., a video ad auction, a display ad auction, a survey auction, and/or other type of auction) and then rendering the highest yielding and most optimized experience across all available paid formats. This may include mixing format types (e.g., taking the highest paying video plus the highest paying survey to create the commercial break) or may involve taking the two highest paying experiences within a format (e.g., the first highest and the second highest yielding video ads) and combining those two to form the commercial break experience.

In addition, the commercial break may offer some choice to the participating user, furnishing them with some amount of choice about the scope and nature of the formats they are required to participate in. For example, users may be offered more or fewer contest credits based on their willingness to watch more ads or lengthier ads and/or answer more surveys as part of the commercial break experience.

Example Flowchart of Processes

Figure 4:
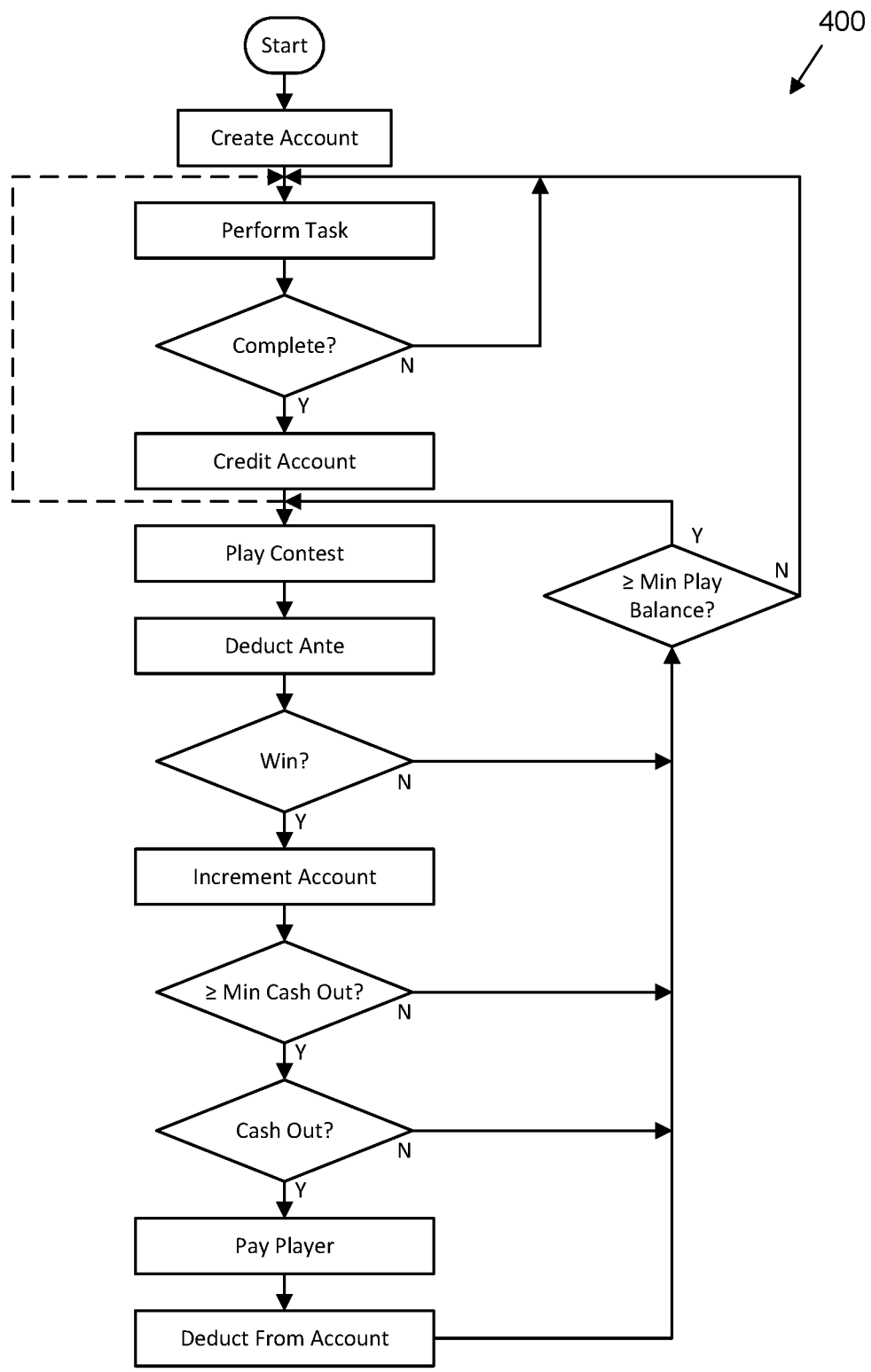
FIG. 4 illustrates an example of a process for facilitating user engagement, in accordance with one or more implementations of the invention.

FIG. 4 illustrates an example of a process 400 for facilitating user engagement, in accordance with one or more implementations of the invention. The operations of process 400 described below are intended to be illustrative and, as such, should not be viewed as limiting. In some implementations, process 400 may be accomplished with one or more additional operations not described, and/or without one or more of the operations discussed. In some implementations, two or more of the operations may occur substantially simultaneously. The described operations may be accomplished using some or all of the system components described in detail above.

As illustrated in FIG. 4, process 400 may begin by creating a user account for a user (if one has not already been created). In various implementations, each user account may be linked to an account balance. Initially, the account balance may be set to $0 (or some other predetermined amount). The user may be presented with a user engagement task. For example, the user may be required to watch and/or interact with a certain amount and/or form of commercial advertising or other content in order to obtain some initial (or additional) money or other form of account credit, which may later be used to compete in a contest. If the user completes the task, the account balance of the user may be credited the amount associated with completing that task. If the user does not complete the task, the user may yet be required to complete the task before playing in the contest (or in a game of the contest).

If the user has enough account credits in their account balance (e.g., by virtue of completing the user engagement task), the user may play a game with one or more other users. The one or more other users may comprise one or more other human participants and/or an artificially intelligent agent or bot. In various implementations, a matchmaking process may be utilized to find another participant to compete with the user. For example, user input may be received from one or more users including a request to compete in a game and a number of account credits to associate with the game. The number of account credits may comprise all or a portion of an account balance linked to an account associated with the user. Responsive to receipt of the user input from a user indicating a request to participate in a game, one or more other users may be identified that have similarly requested to participate in a game associated with the number of account credits. The dynamic contest management platform may be configured to establish an instance of an online game involving the user and at least one other user it has identified. If the user wins the online game, the account of the user may be incremented by the number of account credits associated with the game. If the user loses the online game, the account of the user may be decremented by the number of account credits associated with the game. In some implementations, the number of account credits associated with the game may be deducted from both the account balance of the user and the account balance(s) of the other users involved in the game prior to establishing the instance of the online game and/or commencing the online game. In other words, the number of account credits associated with the online game may comprise an ante, and the winner of the game receives both the ante deducted from the account of the user and the ante deducted from the accounts of each of the other users involved in the game.

If the user wins the game, a determination may be made regarding whether the user may cash out. If the account balance of the user meets or exceeds a threshold account balance to cash out, the user may be prompted to indicate whether they desire to cash out. If the user does not desire to cash out, the user may enter another game by submitting all or a portion of their account balance as an ante for another game. If the user does indeed wish to cash out, the user may be paid as described herein and an equivalent value of that cash out may be deducted from the account balance of the user.

If the user loses the game, a determination may be made regarding whether the user has a minimum balance remaining to participate in another game. If the user balance does not meet or exceed the minimum, the user may be required to perform a user engagement task. If the user balance does meet or exceed the minimum, the user may enter into another game. In some implementations, upon losing a game, when a user does not have enough account credits to participate in a game, and/or in one or more other instances or at one or more predefined intervals, a user may be presented with one or more bonus account credits to enable the user to participate in another game or contest (i.e., to play again) without the user being required to complete a user engagement task. The system may be configured to determine whether and/or when to offer a user another opportunity to play without completing another engagement task using one or more of the techniques described herein.

Figure 5:
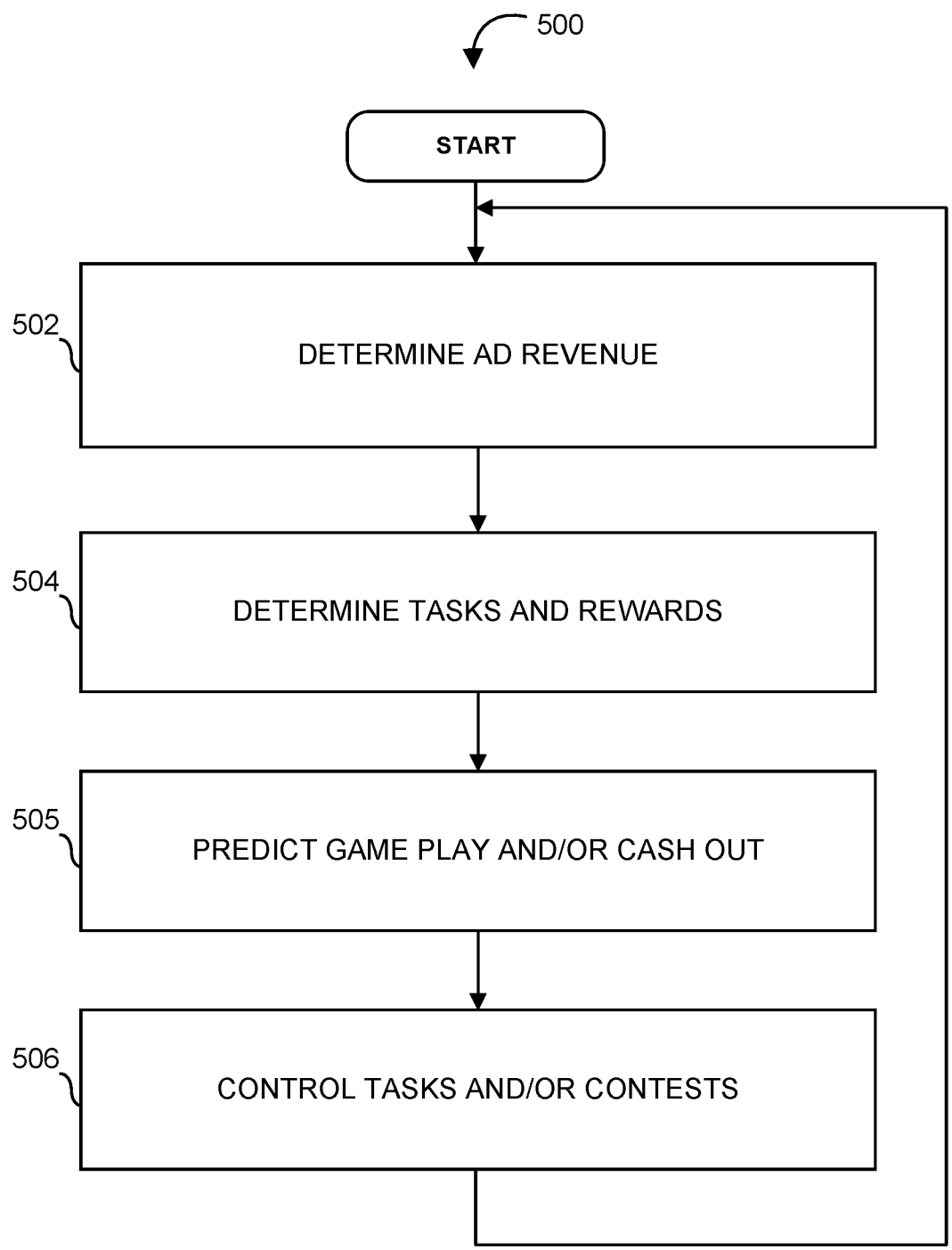
FIG. 5 illustrates an example of a process for implementing a dynamic game or contest management platform, in accordance with one or more implementations of the invention.

FIG. 5 illustrates an example of a process 500 for implementing a dynamic game or contest management platform, in accordance with one or more implementations of the invention. In various implementations, the dynamic contest management platform may be integrated with a programmatic advertising system and configured to utilize substantially real-time programmatic advertising information, predictive analytics, and/or one or more artificial intelligence (AI) algorithms to dynamically adjust contest parameters. The operations of process 500 described below are intended to be illustrative and, as such, should not be viewed as limiting. In some implementations, process 500 may be accomplished with one or more additional operations not described, and/or without one or more of the operations discussed. In some implementations, two or more of the operations may occur substantially simultaneously. The described operations may be accomplished using some or all of the system components described in detail above.

In various implementations, process 500 may include implementing a computer algorithm to balance the various factors contributing to revenue, player experience, and/or potential cash outflows. In an operation 502, process 500 may include predicting ad revenue over a period of time. In an operation 504, process 500 may include determining user engagement tasks and rewards associated with those tasks to help achieve that balance. In an operation 506, process 500 may include predicting the outcomes of gameplay and or the ability of users to cash out given a predetermined threshold required for cash out. In an operation 506, based on these and other factors, process 500 may include controlling the tasks offered to users, the users to whom the tasks are offered, the rewards associated with the tasks, the contests offered to users, the amount of ante and potential winnings for individual contests, the frequency at which users are offered the opportunity to play in contests, and/or the minimum threshold users must achieve in account credits before they can cash out. Among the factors to be considered in the prediction and balancing are: (i) the ads being incorporated into the gameplay experience (ad formats, frequencies, prices, by platform, etc.); (ii) the user experience (how frequently they see ads before losing interest, game types, game frequency/duration, determining how/whether/when to inject additional financial bonuses into the gameplay experience); (iii) the number of players that may play at any point in time (i.e., how many players may be allowed to access the application in each interval, how many games players can play in a given interval, how much can/should be awarded to players for inviting other players etc.); and/or (iv) one or more other factors.

Figure 6:
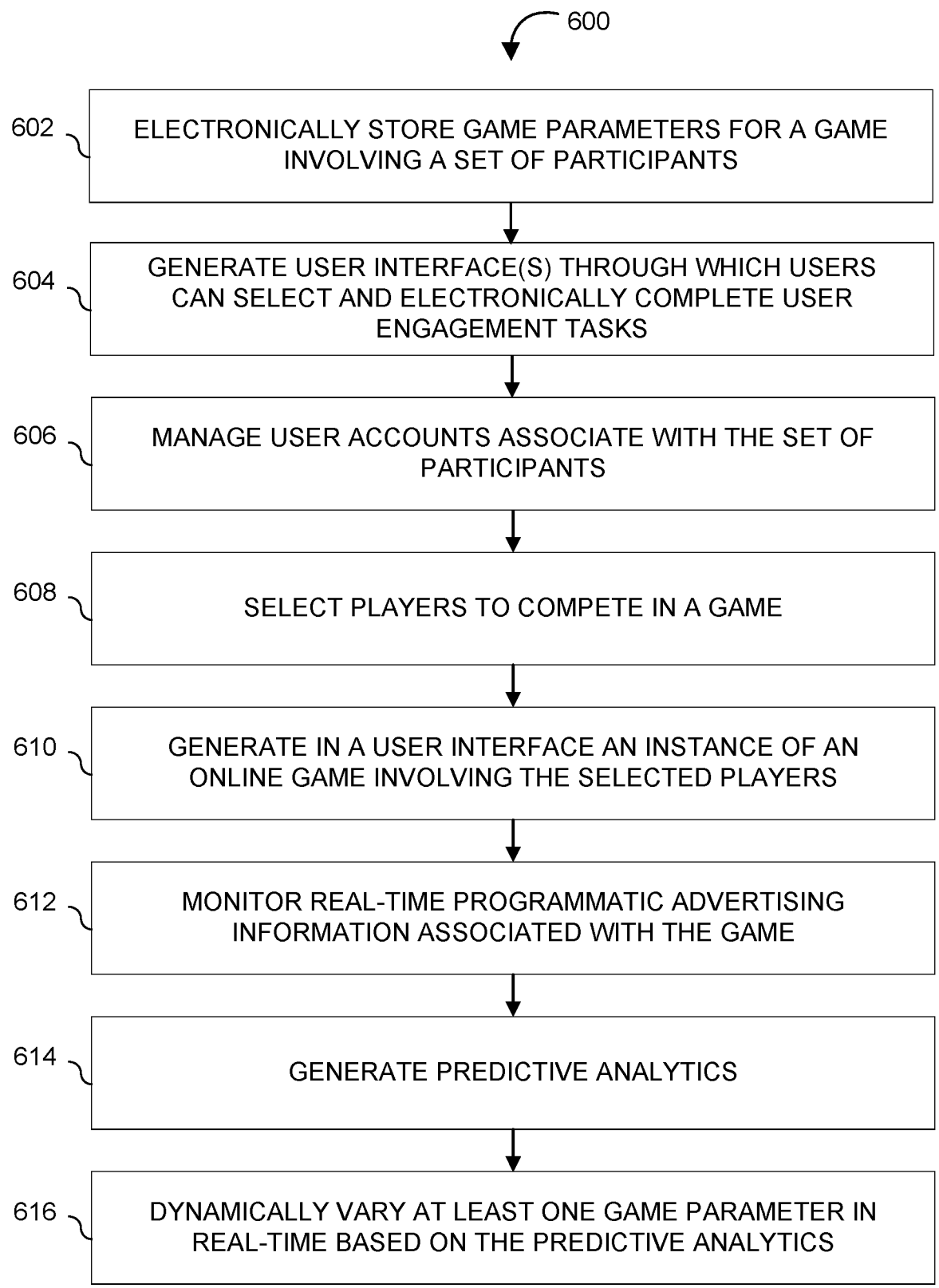
FIG. 6 illustrates an example of a process for implementing a dynamic game or contest management platform, in accordance with one or more implementations of the invention.

FIG. 6 illustrates an example of a process 600 for implementing a dynamic game or contest management platform, in accordance with one or more implementations of the invention. In various implementations, the dynamic contest management platform may be integrated with a programmatic advertising system and configured to utilize substantially real-time programmatic advertising information, predictive analytics, and/or one or more artificial intelligence (AI) algorithms to dynamically adjust contest parameters. The operations of process 600 described below are intended to be illustrative and, as such, should not be viewed as limiting. In some implementations, process 600 may be accomplished with one or more additional operations not described, and/or without one or more of the operations discussed. In some implementations, two or more of the operations may occur substantially simultaneously. The described operations may be accomplished using some or all of the system components described in detail above.

In an operation 602, process 600 may include electronically storing a set of game parameters for a game involving a set of participants. In various implementations, the parameters may be obtained via user input received from an administrator of a game or contest. In various implementations, the set of game parameters may include how often individual participants are permitted to participate in an individual online game, a threshold number of credits required to participate in an instance of an online game, which other players individual participants may be matched with in an online game, a reward for winning an online game, one or more thresholds for receiving a prize, and/or one or more other parameters.

In an operation 604, process 600 may include generating a user interface through which users can select and electronically complete user engagement tasks. For example, user interface information for generating a user interface may be transmitted to a device of a user. In various implementations, implementing a game as described herein may comprise individual participants completing user engagement tasks to receive one or more account credits required to enter a game in which the individual participants compete against one or more other users. In various implementations, the contest may be one that does not offer fixed payout(s). In various implementations, individual user engagement tasks are each associated with a number of credits for completing the user engagement task.

In an operation 606, process 600 may include managing user accounts associated with the set of participants. In various implementations, individual user accounts may be associated with an account balance and information indicating game activity. Responsive to a user completing a user engagement task, the account balance of the user may be incremented the number of credits associated with completing that user engagement task. In various implementations, whether the account balance linked to the account associated with a user meets or exceeds a threshold number of credits required to participate in an online game may be determined. Responsive to a determination that the account balance of a user does not meet or exceed the threshold number of credits, a user engagement task to be completed may be provided to the user. Responsive to a determination that the user has completed the user engagement task, the account balance of the user may be incremented a number of account credits associated with that user engagement task. In various implementations, the number of account credits received for completing a user engagement task may be equivalent to the threshold number of credits required to participate in an online game.

In an operation 608, process 600 may include selecting players to compete in a game. For example, selecting players may involve selecting one or more individual participants from the set of participants based at least on the number of credits in the respective accounts of the one or more individual participants. The selected players may include one or more other participants of the set of participants and/or one or more artificial intelligent agents or bots. In various implementations, user input may be received from participants that includes at least a request to compete in a game and a number of account credits to associate with the game.

The number of account credits may comprise all or a portion of an account balance linked to an account associated with that participant. Responsive to receipt of the user input, the participant may identify one or more participants that have requested to compete in a game associated with the same number of account credits.

In an operation 610, process 600 may include generating an instance of an online game involving the selected players. For example, information for generating an instance of an online game in a user interface may be transmitted to devices of each of the participants involved in the game. The individual participants may compete in the online game for a predefined number of credits. The gameplay and results of the game may be monitored and stored in the account associated with the participants involved in the game. If a user wins the online game, the account balance of the user may be incremented by the number of account credits associated with the online game. If a user loses the online game, the account balance of the user may be decremented by the number of account credits associated with the online game.

In an operation 612, process 600 may include monitoring real-time programmatic advertising information associated with the dynamic game management platform. In some implementations, the programmatic advertising information may be utilized to predict future advertising revenue, as described herein. In some implementations, the programmatic advertising information may be utilized to generate a net revenue score for a set of users (e.g., a specific demographic or other group of users) and/or for one or more individual users. For example, at a high-level, net revenue associated with providing programmatic advertising to individual users may be utilized to dynamically manage the game or contest.

In an operation 614, process 600 may include generating predictive analytics for the dynamic game management platform. For example, predictive analytics may be generated based on predicted future activity from the programmatic advertising system and account activity information associated with the set of participants. In some implementations, the predictive analytics may include one or more projection(s) of future advertising revenue associated with the dynamic game management platform. For example, one or more projection(s) of future advertising revenue may be generated for a given time period. In various implementations, a projection may be generated based on historical advertising revenue information and/or monitored real-time programmatic advertising information associated with the dynamic game management platform. The historical advertising revenue information may include information indicating advertising revenue previously received and/or one or more prior games or contests. In some implementations, projection(s) may be generated utilizing an artificial intelligence (AI) algorithm. For example, historical advertising revenue information and monitored real-time programmatic advertising information associated with dynamic game management platform may be inputted into an artificial intelligence (AI) algorithm, and a projection may be received as an output from the artificial intelligence (AI) algorithm.

In an operation 616, process 600 may include dynamically varying one or more game parameters in real-time based on the predictive analytics. For example, dynamically adjusting contest parameters may comprise adjusting how often individual participants are permitted to participate in an individual online game, a threshold number of credits required to participate in an instance of an online game, which other players individual participants may be matched with in an online game, a reward for winning an online game, one or more thresholds for receiving a prize, and/or one or more other parameters.

The various processing operations and/or data flows depicted in FIGS. 4-6 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. In various implementations, the systems and methods described herein may be configured to implement the dynamic contest management platform by executing some or all of the operations described with respect to FIG. 4, FIG. 5, and/or FIG. 6. In other words, one or more operations of process 400, process 500, and/or process 600 may be separately combined to implement the dynamic contest management platform. Accordingly, the operations as illustrated (and described in greater detail below) are exemplary by nature and, as such, should not be viewed as limiting.

In some implementations, process 400, process 500, and/or process 600 may be implemented in one or more processing devices. The one or more processing devices may include one or more devices executing some or all of the operations described above in response to instructions stored electronically on one or more electronic storage mediums. The one or more processing devices may include one or more devices configured through hardware, firmware, and/or software to be specifically designed for execution of one or more of the operations. In various implementations, the operations may be performed by one or more processor components of system 100 (shown in FIG. 1 and described herein).

For purposes of explanation, numerous specific details are set forth in order to provide a thorough understanding of the description. It will be appreciated by those having skill in the art that the implementations described herein may be practiced without these specific details or with an equivalent arrangement. Accordingly, it is to be understood that the technology is not limited to the disclosed implementations, but, on the contrary, is intended to cover modifications and equivalent arrangements that are within the spirit and scope of appended claims. For example, it is to be understood that the present technology contemplates that, to the extent possible, one or more features of any implementation can be combined with one or more features of any other implementation.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

The various instructions described herein are exemplary only. Other configurations and numbers of instructions may be used, so long as the processor(s) are programmed to perform the functions described herein. The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 112 may be programmed by one or more additional instructions that may perform some or all of the functionality attributed herein to one of the computer-readable instructions.

Although processor(s) 112 are illustrated in FIG. 1 as a single component, this is for illustrative purposes only. In some implementations, processor(s) 112 may comprise multiple processing units. These processing units may be physically located within the same device, or processor(s) 112 may represent processing functionality of multiple devices operating in coordination. In some implementations, one or more processors 112 may be implemented by a cloud of computing platforms operating together as one or more processors 112. Processor(s) 112 be configured to execute one or more components by software; hardware; firmware; some combination of software, hardware, and/or firmware; and/or other mechanisms for configuring processing capabilities on processor(s) 112. As used herein, the term "component" may refer to any component or set of components that perform the functionality attributed to the component. This may include one or more physical processors during execution of processor readable instructions, the processor readable instructions, circuitry, hardware, storage media, or any other components. Furthermore, it should be appreciated that although the various instructions are illustrated in FIG. 1 as being co-located within a single processing unit, in implementations in which processor(s) 112 include multiple processing units, one or more instructions may be executed remotely from the other instructions.

The various instructions described herein may be stored in a storage device, which may comprise random access memory (RAM), read only memory (ROM), and/or other memory. For example, electronic storage 130 may comprise any tangible computer readable storage medium, including random access memory, read only memory, magnetic disk storage media, optical storage media, flash memory devices, and/or other memory configured to computer-program instructions. In various implementations, electronic storage 130 may be configured to store the computer program instructions (e.g., the aforementioned instructions) to be executed by the processors as well as data that may be manipulated by the processors.

One or more databases may be stored in one or more storage devices of system 100 (e.g., electronic storage 130). The databases described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

The various components illustrated in FIG. 1 may be coupled to at least one other component via a network 102, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1, as well as in other drawing Figures, different numbers of entities than those depicted may be used. Furthermore, according to various implementations, the components described herein may be implemented in hardware and/or software that configure hardware.

In some instances, well-known structures and devices are shown in block diagram form in order to avoid unnecessarily obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one implementation", "an implementation", "some implementations", "various implementations", "certain implementations", "other implementations", "one series of implementations", or the like means that a particular feature, design, structure, or characteristic described in connection with the implementation is included in at least one implementation of the disclosure. The appearances of, for example, the phrase "in one implementation" or "in an implementation" in various places in the specification are not necessarily all referring to the same implementation, nor are separate or alternative implementations mutually exclusive of other implementations. Moreover, whether or not there is express reference to an "implementation" or the like, various features are described, which may be variously combined and included in some implementations, but also variously omitted in other implementations. Similarly, various features are described that may be preferences or requirements for some implementations, but not other implementations.

The language used herein has been principally selected for readability and instructional purposes, and it may not have been selected to delineate or circumscribe the inventive subject matter. Other implementations, uses, and advantages of the invention will be apparent to those skilled in the art from consideration of the specification and practice of the invention disclosed herein. The specification should be considered exemplary only, and the scope of the invention is accordingly intended to be limited only by the accompanying claims.

What is claimed is:

1. A computer-implemented system for implementing a dynamic game management platform integrated with a programmatic advertising system, wherein the dynamic game management platform is configured to utilize substantially real-time programmatic advertising information and one or more artificial intelligence (AI) algorithms to dynamically adjust game parameters, the system comprising:
one or more processors; and
a storage device configured to store computer program instructions that, when executed by the one or more processors, configure the one or more processors to:

electronically store a set of game parameters for a game involving a set of participants, the set of game parameters including how often individual participants are permitted to participate in an individual online game, which other players individual participants may be matched with in an online game, and/or one or more thresholds for receiving a prize;

transmit user interface information for generating a user interface through which users can select and electronically complete user engagement tasks, wherein individual user engagement tasks are associated with a number of credits for completing the user engagement task;

manage user accounts associated with the set of participants, wherein individual user accounts are associated with an account balance and information indicating game activity, wherein responsive to a user completing a user engagement task, the account balance of the user is incremented by the number of credits associated with completing that user engagement task;

select players to compete in a game involving one or more individual participants from the set of participants based at least on the number of credits in the respective accounts of the one or more individual participants;

transmit information for generating an instance of an online game involving the selected players in a user interface, wherein the one or more individual participants compete in the online game for a predefined number of credits;

monitor real-time programmatic advertising information associated with the dynamic game management platform;

generate predictive analytics based on predicted future activity from the programmatic advertising system and account activity information associated with the set of participants; and dynamically vary in real-time at least one game parameter of the set of game parameters based on the predictive analytics.

2. The system of claim 1, wherein the set of game parameters include a threshold number of credits required to participate in an instance of an online game and/or a reward for winning the game.

3. The system of claim 1, wherein the predictive analytics include a projection related to future advertising revenue generated in association with the dynamic game management platform during a given time period based on historical advertising revenue information and the monitored real-time programmatic advertising information.

4. The system of claim 3, wherein the one or more processors are further configured to:
input the historical advertising revenue information and the monitored real-time programmatic advertising information into an artificial intelligence (AI) algorithm; and
receive as output from the artificial intelligence (AI) algorithm the projection related to future advertising revenue generated in association with the dynamic game management platform.

5. The system of claim 1, wherein the one or more processors are further configured to:
receive first user input from a first participant of the set of participants, the first user input including at least a request to compete in a game and a first number of account credits to associate with the game, wherein the first number of account credits comprises all or a portion of a first account balance linked to an account associated with the first participant;
receive second user input from a second participant of the set of participants, the second user input including at least a request to compete in a game and a second number of account credits to associate with the game, wherein the second number of account credits comprises all or a portion of a second account balance linked to an account associated with the second participant and is equivalent to the first number of account credits;
responsive to receipt of the first user input indicating a request to compete in a game, identify one or more participants of the set of participants that have requested to compete in a game associated with the same number of account credits, wherein the second participant is selected from the identified one or more participants; and
responsive to a determination that the first participant has won the online game and the second participant has lost the online game, cause the first account balance to be incremented the second number of account credits and cause the second account balance to be decremented the second number of account credits.

6. The system of claim 5, wherein the set of game parameters include a threshold number of credits required to participate in an instance of an online game, wherein responsive to the receipt of the first user input indicating a request to compete in a game, the one or more processors are further configured to:
determine whether the first account balance linked to the account associated with the first participant meets or exceeds the threshold number of credits;
responsive to a determination that the first account balance linked to the account associated with the first participant does not meet or exceed the threshold number of credits, cause a user engagement task to be provided to the first participant; and
responsive to a determination that the first participant has completed the user engagement task, cause the first account balance to be incremented a number of account credits associated with the user engagement task, wherein the number of account credits associated with the user engagement task meets or exceeds the threshold number of credits.

7. The system of claim 1, wherein the set of game parameters include a threshold number of credits required to receive a prize, wherein the one or more processors are further configured to:
receive user input from a user indicating a request to receive a prize, wherein the user input includes a requested prize value;
determine that the requested prize meets or exceeds the threshold number; and
responsive to the determination that the requested prize value meets or exceeds the threshold number, cause an account balance associated with the user to be decremented the requested prize value and a financial account of the user to be credited a monetary amount equivalent to the requested prize value.

8. The system of claim 1, wherein the selected players include one or more other participants of the set of participants and/or one or more artificially intelligent agents or bots.

9. A computer-implemented method of implementing a dynamic game management platform integrated with a programmatic advertising system, wherein the dynamic game management platform is configured to utilize substantially real-time programmatic advertising information and one or more artificial intelligence (AI) algorithms to dynamically adjust game parameters, the method being implemented in a computer system comprising one or more processors and a storage device configured to store computer program instructions that, when executed by the one or more processors, configure the one or more processors to perform the method, the method comprising electronically storing, by the computer system, a set of game parameters for a game involving a set of participants, the set of game parameters including how often individual participants are permitted to participate in an individual online game, which other players individual participants may be matched with in an online game, and/or one or more thresholds for receiving a prize;

transmitting, by the computer system, user interface information for generating a user interface through which users can select and electronically complete user engagement tasks, wherein individual user engagement tasks are associated with a number of credits for completing the user engagement task;

managing, by the computer system, user accounts associated with the set of participants, wherein individual user accounts are associated with an account balance and information indicating game activity, wherein responsive to a user completing a user engagement task, the account balance of the user is incremented the number of credits associated with completing that user engagement task;

selecting, by the computer system, players to compete in a game involving one or more individual participants from the set of participants based at least on the number of credits in the respective accounts of the one or more individual participants;

transmitting, by the computer system, information for generating an instance of an online game involving the selected players in a user interface, wherein the one or more individual participants compete in the online game for a predefined number of credits;

monitoring, by the computer system, real-time programmatic advertising information associated with the dynamic game management platform;

generating, by the computer system, predictive analytics based on predicted future activity from the programmatic advertising system and account activity information associated with the set of participants; and dynamically varying, by the computer system, in real-time at least one game parameter of the set of game parameters based on the predictive analytics.

10. The method of claim 9, wherein the set of game parameters include a threshold number of credits required to participate in an instance of an online game and/or a reward for winning the game.

11. The method of claim 9, wherein the predictive analytics include a projection related to future advertising revenue generated in association with the dynamic game management platform during a given time period based on historical advertising revenue information and the monitored real-time programmatic advertising information.

12. The method of claim 11, the method further comprising:

inputting, by the computer system, the historical advertising revenue information and the monitored real-time programmatic advertising information into an artificial intelligence (AI) algorithm; and receiving, by the computer system, as output from the artificial intelligence (AI) algorithm the projection related to future advertising revenue generated in association with the dynamic game management platform.

13. The method of claim 9, the method further comprising:

receiving, by the computer system, first user input from a first participant of the set of participants, the first user input including at least a request to compete in a game and a first number of account credits to associate with the game, wherein the first number of account credits comprises all or a portion of a first account balance linked to an account associated with the first participant;

receiving, by the computer system, second user input from a second participant of the set of participants, the second user input including at least a request to compete in a game and a second number of account credits to associate with the game, wherein the second number of account credits comprises all or a portion of a second account balance linked to an account associated with the second participant and is equivalent to the first number of account credits;

responsive to receipt of the first user input indicating a request to compete in a game, identifying, by the computer system, one or more participants of the set of participants that have requested to compete in a game associated with the same number of account credits, wherein the second participant is selected from the identified one or more participants; and responsive to a determination that the first participant has won the online game and the second participant has lost the online game, causing, by the computer system, the first account balance to be incremented the second number of account credits and the second account balance to be decremented the second number of account credits.

14. The method of claim 13, wherein the set of game parameters include a threshold number of credits required to participate in an instance of an online game, wherein responsive to the receipt of the first user input indicating a request to compete in a game, the method further comprises:

determining, by the computer system, whether the first account balance linked to the account associated with the first participant meets or exceeds the threshold number of credits;

responsive to a determination that the first account balance linked to the account associated with the first participant does not meet or exceed the threshold number of credits, causing, by the computer system, a user engagement task to be provided to the first participant; and responsive to a determination that the first participant has completed the user engagement task, causing, by the computer system, the first account balance to be incremented a number of account credits associated with the user engagement task, wherein the number of account credits associated with the user engagement task meets or exceeds the threshold number of credits.

15. The method of claim 9, wherein the set of game parameters include a threshold number of credits required to receive a prize, the method further comprising:

receiving, by the computer system, user input from a user indicating a request to receive a prize, wherein the user input includes a requested prize value;

determining, by the computer system, that the requested prize meets or exceeds the threshold number; and responsive to the determination that the requested prize value meets or exceeds the threshold number, causing, by the computer system, an account balance associated with the user to be decremented the requested prize value and a financial account of the user to be credited a monetary amount equivalent to the requested prize value.

16. The method of claim 9, wherein the selected players include one or more other participants of the set of participants and/or one or more artificially intelligent agents or bots.

\* \* \* \* \*